United States Patent
Haferbeck et al.

(10) Patent No.: US 7,466,709 B1
(45) Date of Patent: Dec. 16, 2008

(54) ATM SWITCHING EQUIPMENT HAVING A SWITCHING NETWORK

(75) Inventors: Ralf Haferbeck, Munich (DE); Stefan Schneeberger, Vaterstetten (DE)

(73) Assignee: Nokia Siemens Networks GmbH & Co KG, Munich (DE)

( * ) Notice: Subject to any disclaimer, the term of this patent is extended or adjusted under 35 U.S.C. 154(b) by 635 days.

(21) Appl. No.: 09/826,357

(22) Filed: Jun. 14, 2000

(30) Foreign Application Priority Data

Jun. 14, 1999 (DE) ................................. 199 26 959

(51) Int. Cl.
*H04L 12/28* (2006.01)
*H04L 12/56* (2006.01)

(52) U.S. Cl. ............................. 370/395.64; 370/395.1; 370/395.6

(58) Field of Classification Search ................. 370/351, 370/389, 392, 395.1, 396–399, 395.3, 395.41, 370/395.6, 395.64
See application file for complete search history.

(56) References Cited

U.S. PATENT DOCUMENTS

| | | | | |
|---|---|---|---|---|
| 5,414,701 A | * | 5/1995 | Shtayer et al. | 370/395.3 |
| 6,031,838 A | * | 2/2000 | Okabe et al. | 370/395.6 |
| 6,266,343 B1 | * | 7/2001 | Caves | 370/466 |
| 6,289,016 B1 | * | 9/2001 | Subbiah et al. | 370/395.1 |
| 6,449,276 B1 | * | 9/2002 | Subbiah et al. | 370/395.6 |
| 6,594,267 B1 | * | 7/2003 | Dempo | 370/395.64 |

* cited by examiner

*Primary Examiner*—Wing F Chan
*Assistant Examiner*—Saba Tsegaye
(74) *Attorney, Agent, or Firm*—Bell, Boyd & Lloyd LLP

(57) ABSTRACT

An ATM switching equipment is provided comprising a switching network (ASN) and at least one server switching unit (SSC). The server switching unit (SSC) contains an AAL2 switcher (ASW) that is configured for simultaneous processing of a maximum plurality (m) of incoming connections. An AAL2 routing list (RL1 . . . RLm) is provided for each of these connections, and a microprocessor (MPR) is configured to limit the allowable value range for VPI/VCI values in the header of the ATM cells according to the plurality of AAL2 routing lists, so that only the corresponding VPI/VCI coding bits are taken into consideration at an interface to the switching network.

5 Claims, 2 Drawing Sheets

ATM SWITCHING EQUIPMENT HAVING A SWITCHING NETWORK

BACKGROUND OF THE INVENTION

1. Field of the Invention

The invention is directed to an ATM switching equipment having a switching network, an input interface unit containing an input processing unit, at least one output interface unit containing an output processing unit and having a microprocessor, in which the switching equipment is configured to write a new VPI/VCI information for the further connecting section into the cells of the arriving data streams upon utilization of routing tables.

2. Description of the Related Art

Asynchronous transfer mode (ATM) is a network technology that is suited for the transport of all known signal data such as pure data, voice and video data, etc.

ATM may be utilized as the connection-oriented packet switching method for B-ISDN (broadband integrated services digital network). Structuring equal-length cells is characteristic for ATM. Information to be communicated is divided onto ATM cells that comprise 53 bytes, which includes: a cell header with 5 bytes and payload information of 48 bytes. The header information identifies a specific virtual connection and all cells follow the transmission path determined as a result this virtual connection identification that is defined at the set up of the connection by virtual connections in a network.

An overview of ATM is provided, for example, by "ATM-Networks, Concepts, Protocols and Applications" by Händel, Huber and Schröder, Addison-Wesley-Longman, $2^{nd}$ Edition, 1994 (ISBN 0-201-42274-3).

In contrast to a TDMA method in which time slots are assigned in advance to different types of data traffic, incoming data traffic at an ATM interface is segmented into said 53-byte cells, and these cells are sequentially forwarded in the way they were generated. The routing of the cells through a network occurs upon utilization of the routing information stored in the cell header (see FIG. 1)

FIG. 1 shows the exemplary structure of the field of an ATM cell. In the case of a user network interface UNI, the first 4 bits contain the "generic flow control" GFC, and contain a virtual path identifier VPI in the case of a network node interface NNI. Another 4 bits VPI follow in this structure in the first line, 4 more bits in the next line, and a total of 2 bytes for a virtual channel identifier VCI.

In the fourth byte (or the fourth line), the VCI information are followed by another three bits of information with respect to the payload type PT and a one-bit information with respect to the cell loss priority CLP; and the last byte of the header contains the header error control HEC. The header is followed by said 48 bytes of payload INF.

The VCI information serves for distinguishing between the various logical channels in a switching section; the VPI information relates to channel bundles that are respectively composed of a plurality of virtual channels, by which cells within a bundle can be rapidly processed by a switching network in an exchange. The PT information identifies the type of payload field, by which the information field of the cell must also be interpreted in a switching center in addition to the header field; but payload data contained therein are skipped in an exchange.

The header error control HEC is nothing more than a checksum that identifies errors in the header of the cell that, for example, are produced by transmission errors. The information CLP references ATM cells that are of less significance and can be potentially discarded for buffer overflows.

Routing tables are employed when switching ATM cells, by which the controller of an exchange: 1) acquires the information VCI and VPI from the arriving cell, 2) respectively determines the information VPI, VCI for the following connecting section with the assistance of the routing tables, and 3) enters them in the cell header, and the cell is forwarded to the output of the exchange.

A layer model has also been specified for the ATM technology by which a distinction is made between the physical layer, the actual ATM layer, the ATM adaption layer AAL and higher layers (higher layer protocols). This layer model is presented, for example, in "ATM, Solutions for Enterprise Internetworking", David Ginsburg, Addison-Wesley 1996, ISBN 0-201-87701-5, in which the corresponding recommendations of ITU are also referenced in Chapter 2.2.

In addition to these four layers, the AAL layer being of particular interest in the framework of the invention, a distinction is also made between three different levels, namely the user level, the control level, and the administration level.

The AAL layer adapts the higher-ranking layers to the ATM layer and implements: 1) the subdivision of the data streams into cells at the transmission side, and 2) the merging to form messages at the reception side. Different running times are also compensated by the AAL layer.

For uniformity, the protocols of the AAL layer have been divided into various classes and, with respect to this, Chapter 3.1.4 "Adaption" in the above work by Ginsburg or "Mobilftinknetze und Ihre Protokolle", Volume 2, B. Walke, Täubner Stuttgart 1998, ISBN 3-519-06431-6, Chapter 8.2.5, "ATM-Dienstklassen", can be referenced. However, in addition to the four service groups originally specified by ITU, there is also an AAL5 group that was initially optimized for the data transport on the part of the industry and whose development is ongoing in the ITU standardization process (see Ginsburg, p. 83).

Class 2 is especially of interest in the framework of the invention; this class deals with the AAL2 protocol used, for example, for real-time services with variable and low bit rate. The inherently two-layer structure that has both the ATM layer as well as the AAL2 layer is unique for AAL2. Accordingly, A two-layer switching, namely an ATM switching and an AAL2 switching, must occur in a switching node.

SUMMARY OF THE INVENTION

An object of the invention is to create a switching equipment that can be realized with minimal outlay despite the extremely complex two-layer switching.

This object is achieved with a switching equipment of the species initially cited in which at least one server switching unit is inventively provided. This server switching unit contains an AAL2 switcher that is connected to the switching network via an interface and an input processing unit as well as an output switching unit. The AAL2 switcher is configured for simultaneous processing of a maximum plurality of incoming connections, an AAL2 routing list is provided for each of these connections, and the microprocessor is configured to limit the allowable value range for VPI/VCI values in the header of the ATM cells according to the plurality of AAL2 routing lists, so that only the corresponding VPI/VCI coding bits are to be taken into consideration at the interface.

According to the invention, an AAL2 switcher can be advantageously connected to the ATM switching network without requiring a recognition of all VPI/VCI possibilities in the AAL2 switcher, saving a lot of memory space and permitting operation with just a modest computing capacity.

In a preferred embodiment of the invention, the interface is a UTOPIA interface. This standardized interface has proven itself well for the connection of AAL2 switchers to the ATM switching network.

Utilizing only a single virtual path established between the switching network and at least one server switching unit can also reduce expenditure.

BRIEF DESCRIPTION OF THE DRAWINGS

The invention together with further advantages is explained in greater detail below with reference to the drawings.

DESCRIPTION OF THE PREFERRED EMBODIMENTS

Figure 2:
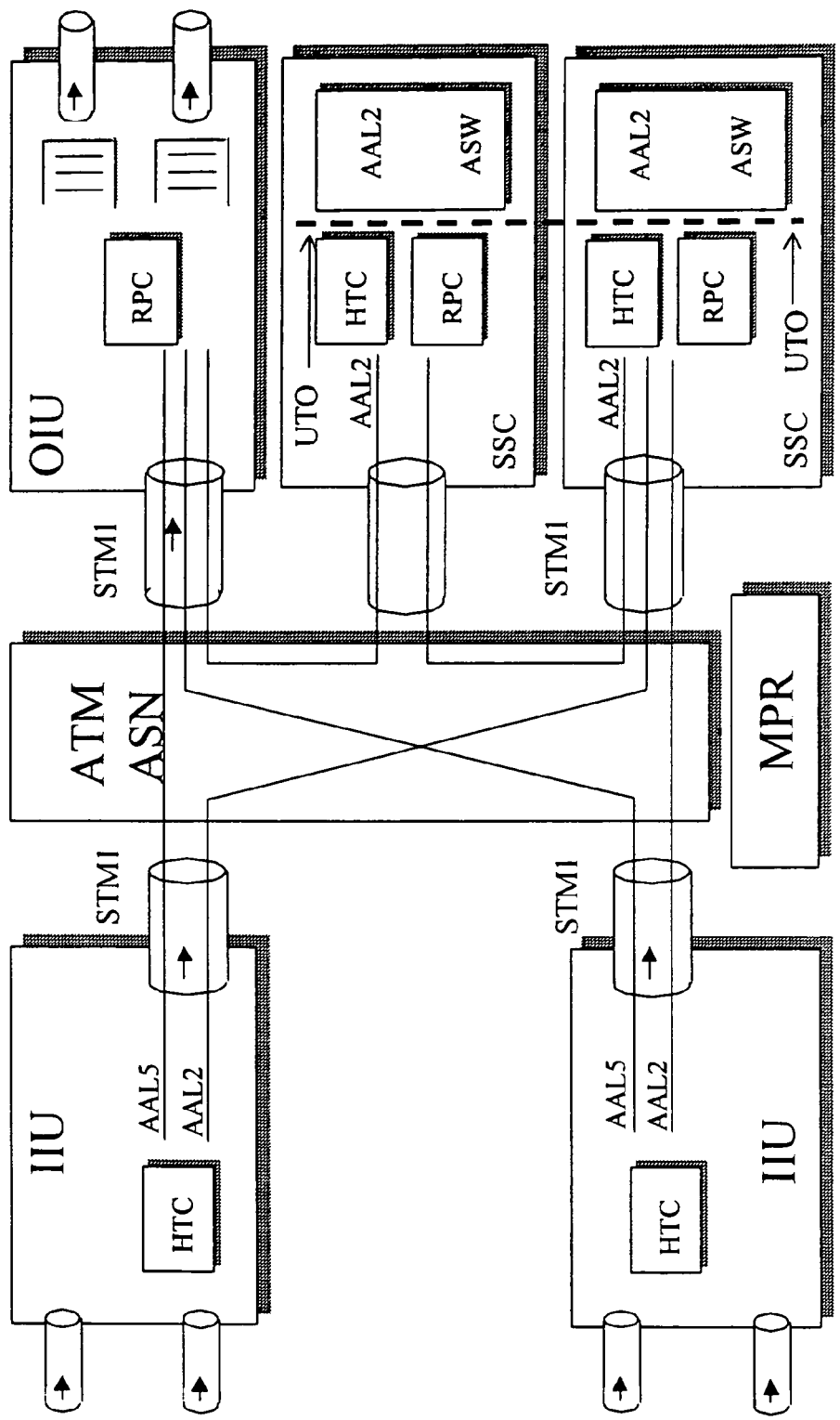
FIG. 2 is a block circuit diagram of an ATM switching equipment of the invention having two server switching units connected to the switching network.

FIG. 2 shows an ATM switching network ASN to which: 1) two input interface units IIU are connected at the left, 2) an output interface unit OIU is connected at the upper right, and 3) two server switching units SSC are connected below. The server switching units SSC each contain an AAL2 switcher ASW realized as ASIC having a respective input processing unit HTC placed preceding it or, respectively, an output processing unit RPC. The linking of the server switching units SSC to the switching network ASN takes place via a respective UTOPIA interface UTO that is symbolically shown. The input interface units IIU each have an input processing unit HTC, and the output interface unit has an output processing unit RPC.

As can be derived from FIG. 2, incoming ATM connections that contain AAL5 connections are directly switched via the switching network ASN to the output interface unit OIU, whereas ATM connections that contain AAL2 connections proceed via the two server switching units SSC to the output interface unit. For simplification, the illustrated example assumes that only a single virtual path is respectively established between the switching network ASN and each server switching unit SSC. The control of the switching equipment takes place via a microprocessor MPR that need not necessarily be centrally realized, as shown in FIG. 2.

The cell stream arriving from the switching network ASN is first handled in the output processing unit at the server switching unit SSC, so that the microprocessor MPR has already communicated the connection information to the server switching unit SSC at the connection setup. Following the output processing, the ATM cells are handed over to the AAL2 switcher ASW in their external format, i.e., in the standard format, the AAL2 switcher ASW implementing a demultiplexing in which the AAL2 packets are extracted from the ATM ells, so that AAL2 connections can be unambiguously determined.

According to the standard, up to 248 AAL2 connections can be carried in each VCI/VPI connection. All of these connections must be completely listed for each ATM connection, this taking place in routing lists (RL1 ... RLm) (see FIG. 3). A routing list with 248 entries is therefore required for each ATM connection from 1 to m that ends in an AAL2 switcher SSC.

When all VCI/VPI information in the ATM cell are interpreted, then exactly the same number of routing lists as potential VCI/VPI combinations must be available and capable of being recognized; this number is $2^{28}$ according to the ATM standard. Since, for capacity reasons, only a few hundred ATM connections terminate in each AAL2 switcher, the invention provides that one is limited to a few VPI/VCI values, permitting a reduction of the expenditure for searching the routing lists RL1 ... RLm.

Fundamentally, the external, standardized ATM format is employed in the transmission of the ATM cells via the UTOPIA interfaces. Since, however, the service switching unit SSC or, respectively, the AAL2 switcher ASW forms a self-contained unit according to the invention that serves only for switching, the invention provides not to support the complete standard for the ATM cell format with all areas. When setting up an ATM connection via the UTOPIA interface, the microprocessor is only given VPI/VCI values from a previously declared, limited supply.

When, for example, a module can simultaneously process 512 ATM connections, only 512 connections need be discriminated at the UTOPIA interface 512 connections can be discriminated by 9 bits, so that only 9 bits are then required in the header. Such a removal/suppression of bits in the cell structure is not allowed at an external interface but is not a problem in the present case since the UTOPIA interface is located within the system of the service switching unit SSC.

Figure 1:
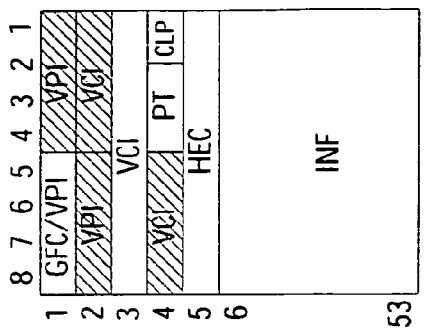
FIG. 1 is a structure diagram showing the structure of a standardized ATM cell and a reference to information suppressed in the framework of the invention.

In FIG. 1, a plurality of the VPI or, respectively, VCI bits are shown hatched in the header of the ATM cell—the last four bits of the first line, the complete second line and the first four bits of the fourth line in the present example. These bits are suppressed; only twelve VPI or, respectively, VCI bits have to be interpreted. The microprocessor is configured to assign only those VPI/VCI combinations on the UTOPIA interface that differ only on the basis of the bits shown not hatched in FIG. 1. The microprocessor is programmed according to the plurality of connections that a server switching unit SSC can simultaneously process.

Figure 3:
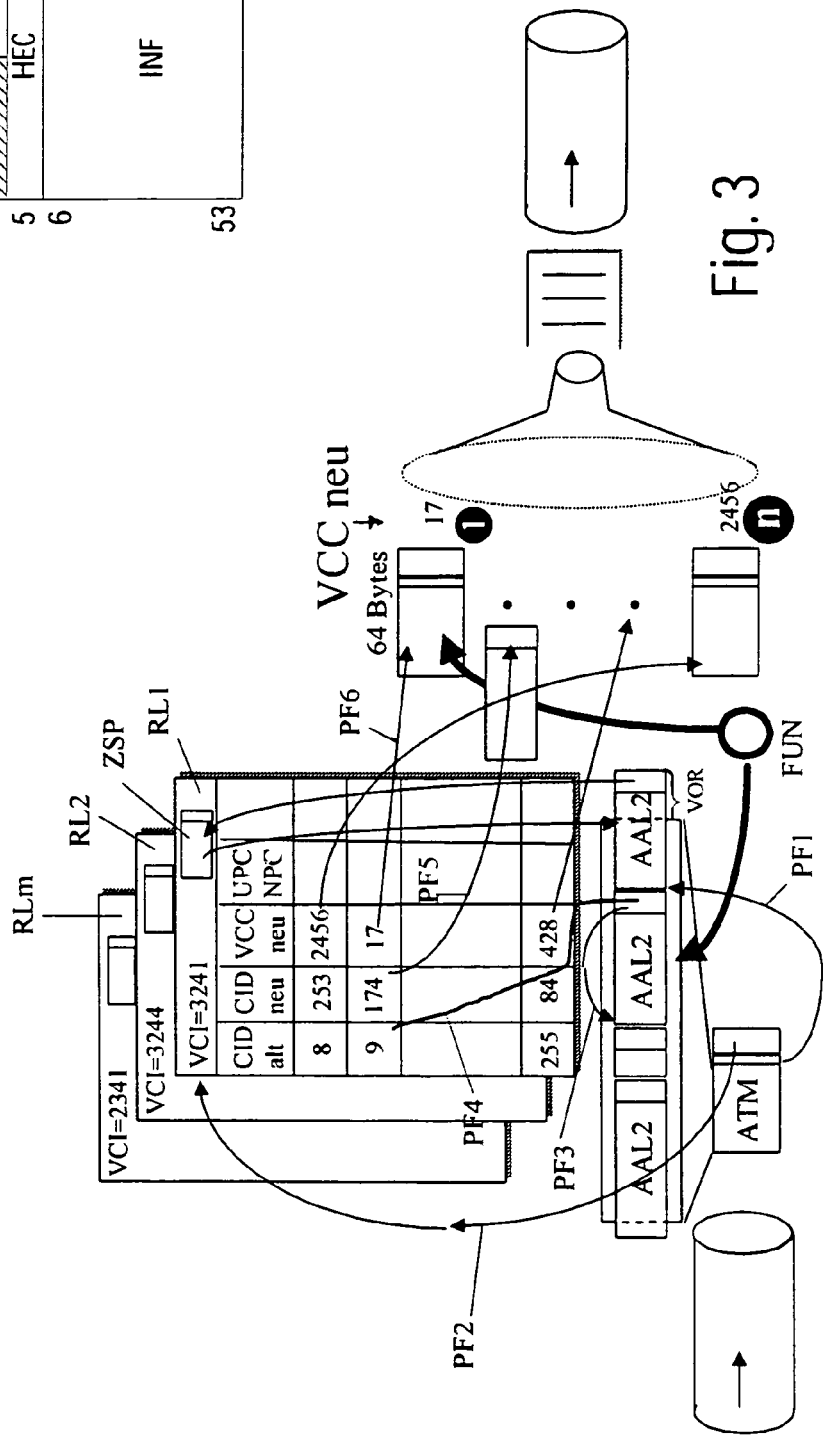
FIG. 3 is a block schematic diagram illustrating an AAL2 switcher of a server switching unit shown schematically and symbolically.

The illustration of FIG. 3 shows m arriving ATM virtual channel connections that contain AAL2 connections. According to FIG. 3, m routing lists RL1 ... RLm are provided. The plurality of departing (at the right) virtual channel connections with AAL2 connections is represented by n. With the assistance of the symbolically illustrated functionality FUN of the ASIC of the server switching unit SSC, AAL2 packets are unpacked from the payload of an arriving (at the lower left) ATM cell that is referenced ATM. Four such AAL2 packets are shown above the ATM cell; the AAL2 packets need not fit exactly into the ATM cell (its payload), as indicated by a projection at the left and right.

In the present case, there is a preceding part of the right-hand AAL2 packet, composed of a header and a part of the AAL2 payload that was already contained in a previously arriving ATM cell of the same connection, which is referenced VOR and, and was contained in the routing list RL1 in a buffer memory ZSP indicated at the upper right. This beginning of the right-hand AAL2 packet is fetched from the buffer memory, and the rudimentary payload part of the AAL2 packet that was contained in the ATM cell is completed with the assistance of the functionality FUN. The arrow proceeding toward the top and then toward the right from the functionality FUN indicates that the AAL2 packets are then transmitted as indicated toward the right to the multiplexing part. A plurality of AAL2 packets can be contained in an ATM cell, so that the symbolic illustration should only be considered an example. Theoretically, twelve AAL2 packets could also have been contained in an ATM payload.

In FIG. 3, an arrow PF1 points from the first byte of the ATM cell payload to the beginning of the first AAL2 header. This pointer is important in order to be able to resynchronize given cell loss. The arrow PF2 pointing away from the header of the ATM cell points to the VCI connection in the routing list, represented by the number 3241 in this figure. The arrow referenced PF3 from the header of the middle AAL2 packet indicates that one byte from the header specifies the length of the payload of the AAL2 packet. The arrow PF4 from the header of the middle AAL2 packet that points to the number 9 in the routing list indicates which of the 248 AAL2 connections this packet belongs to. Analogously, the arrow PF5 points to a departing AAL2 packet and indicates that the new connection identifier CID, "174" here, is again written at the same location in the transfer that the functionality implements. The arrow PF6 identifies the new virtual channel connection VCC with the number 17. The one byte in the ATM payload mentioned above is a pointer to the first AAL2 header occurring in the ATM payload, which is the header from which the arrows PF3 and PF4 depart.

The above-described ATM switching equipment are illustrative of the principles of the present invention. Numerous modifications and adaptions thereof will be readily apparent to those skilled in this art without departing from the spirit and scope of the present invention.

What is claimed is:

1. An ATM switching equipment comprising:
   a switching network;
   an input interface unit including an input processing unit;
   an output interface unit including an output processing unit;
   a microprocessor;
   a server switching unit comprising:
      an AAL2 switcher that is connected to the switching network via a first interface;
      an input processing unit to which said AAL2 switcher is connected; and
      an output processing unit to which said AAL2 switcher is connected;
   said switching equipment being configured to write a new VPI/VCI information, including VP/VCI bits, for a further connecting section into cells of arriving data streams upon utilization of routing tables,
   said AAL2 switcher being configured for simultaneous processing of a maximum plurality of incoming connections, an AAL2 routing list being provided for each of said incoming connections;
   said AAL2 switcher being connected to said switching network without requiring recognition of all VPINCI bits in the AAL2 switcher; and
   said microprocessor limiting the number of bits representing VPINCI bits from among VPI/VCI bits transmitted in a header of ATM cells to be interpreted according to a number of ATM connections available for processing, as indicated in said AAL2 routing lists, so that said first interface considers corresponding VPI/VCI bits.

2. The ATM switching equipment according to claim 1, wherein said first interface is a UTOPIA interface.

3. The ATM switching equipment according to claim 1, wherein a single virtual path is established between said switching network and said server switching unit.

4. The ATM switching equipment according to claim 1, further comprising:
   buffer memories which are allocated to said routing lists; and
   a section of an AAL2 packet of an ATM cell being writable into said buffer memories, said section being readable from said buffer memories when processing a next-successive ATM cell and for completion of a remainder of said AAL2 packet.

5. An ATM switching apparatus, comprising:
   a microprocessor; and
   a server switching unit, comprising:
      an input processing unit;
      an AAL2 switcher that is coupled to the input processing unit, and is further coupled to a switching network via a first interface;
      an output processing unit, coupled to the AAL2 switcher, wherein the AAL2 switcher simultaneously processes a maximum plurality of incoming connections, and wherein an AAL2 routing list is provided for each of the incoming connections;
   wherein the ATM switching apparatus writes new VPI/VCI information including VPI/VCI bits for a further connecting section into cells of arriving data streams using routing tables, and wherein the microprocessor limits the number of bits representing VPI/VCI bits from among VPI/VCI bits transmitted in a header of ATM cells to be interpreted according to a number of ATM connections available for processing as indicated in the AAL2 routing lists, so that the first interface considers corresponding VPI/VCI bits.

* * * * *